United States Patent
Reedijk et al.

(10) Patent No.: US 7,976,763 B2
(45) Date of Patent: Jul. 12, 2011

(54) METHOD OF MAKING A PROTECTIVE ELEMENT FOR A BREAKWATER OR WAVE-RETARDING CONSTRUCTION

(75) Inventors: Jan Sebastiaan Reedijk, Gouda (NL); Martijn Klabbers, Rotterdam (NL); Markus Muttray, Gouda (NL)

(73) Assignee: HBG Civiel B.V., Gouda (NL)

( * ) Notice: Subject to any disclaimer, the term of this patent is extended or adjusted under 35 U.S.C. 154(b) by 1245 days.

(21) Appl. No.: 11/636,446

(22) Filed: Dec. 11, 2006

(65) Prior Publication Data

US 2007/0080478 A1    Apr. 12, 2007

Related U.S. Application Data

(62) Division of application No. 10/521,964, filed as application No. PCT/NL03/00541 on Jul. 24, 2003, now Pat. No. 7,160,057.

(30) Foreign Application Priority Data

Jul. 24, 2002 (NL) ...................................... 1021146

(51) Int. Cl.
*B28B 1/00* (2006.01)
*B28B 1/14* (2006.01)
*B28B 13/00* (2006.01)
*B28B 7/00* (2006.01)
*B28B 7/20* (2006.01)
*E02B 3/14* (2006.01)

(52) U.S. Cl. . 264/333; 264/334; 264/318; 264/DIG. 59; 264/34; 249/160; 425/441; 405/29

(58) Field of Classification Search .................. 249/160; 425/441; 405/29; 264/34, 318, DIG. 59, 264/333, 334
See application file for complete search history.

(56) References Cited

U.S. PATENT DOCUMENTS

| 3,252,287 | A |   | 5/1966  | Bunko |
| 3,484,514 | A | * | 12/1969 | Longinotti ..................... 264/163 |
| 3,582,034 | A |   | 6/1971  | Tsuzuki |
| 3,614,866 | A |   | 10/1971 | Kaneko |
| 3,753,553 | A |   | 8/1973  | Bockting |
| 3,759,043 | A |   | 9/1973  | Tokunaga |

(Continued)

FOREIGN PATENT DOCUMENTS

DE    198 15 205    10/1998

(Continued)

OTHER PUBLICATIONS

E.E.T.:, "Project C-Fix wil tweede fase in" Digitale Nieuwsbrief Van Het Programma E.E.T., 'Online! No. 5, Mar. 27, 2003, XP002267789, Retrieved from the Internet: <URL:httP://www.eet.nl/nieuws/nwsbrf5_2003.htm>'retrieved on Jan. 22, 2004!, the whole document.

*Primary Examiner* — Christina Johnson
*Assistant Examiner* — Patrick Butler
(74) *Attorney, Agent, or Firm* — Young & Thompson

(57) ABSTRACT

A protective element for a breakwater or wave-retarding construction comprises a body that has at least two opposing projections. The projections are on either side of a flat base and extend transversely thereto. The periphery of the base is non-circular, so that rolling of the protective element under the influence of the beating of the waves is resisted.

11 Claims, 4 Drawing Sheets

U.S. PATENT DOCUMENTS

| | | | |
|---|---|---|---|
| 4,347,017 A | | 8/1982 | Chevallier |
| 4,594,206 A | * | 6/1986 | Grafton .......................... 264/35 |
| 4,902,166 A | | 2/1990 | Bores |
| 5,441,362 A | | 8/1995 | Melby et al. |
| 5,501,546 A | | 3/1996 | Dorrell |
| 5,879,105 A | | 3/1999 | Bishop |
| 6,508,042 B1 | | 1/2003 | Kweon et al. |

FOREIGN PATENT DOCUMENTS

| | | |
|---|---|---|
| FR | 2 734 292 | 11/1996 |
| GB | 970 199 | 9/1964 |
| JP | 03183811 | 8/1991 |
| NL | 1 016 098 | 3/2002 |
| WO | WO 00/17453 A1 * | 4/2000 |

* cited by examiner

METHOD OF MAKING A PROTECTIVE ELEMENT FOR A BREAKWATER OR WAVE-RETARDING CONSTRUCTION

BACKGROUND OF THE INVENTION

1. Field of the Invention

The invention relates to a protective element for a breakwater or wave-retarding construction, comprising a concrete body that has at least two opposing projections.

2. Description of the Related Art

A protective element of this type is disclosed in NL-A 8903138. Such protective elements are intended for the parts of, for example, breakwaters, dams and the like that are exposed to the beating of the waves. The waves break as soon as they strike the protective elements, with the result that the underlying parts are better protected against the forces of the water.

The protective elements are usually made of concrete. Usually no reinforcement is used on the grounds of durability. Although a reinforcement has a beneficial effect on the strength of the protective element, it nevertheless has the disadvantage that rusting can hardly be prevented, especially in a salty environment. This means that the strength of the protective element has to be provided by the concrete material alone. It is therefore necessary to choose as advantageous as possible a shape for the protective element. Despite the lack of reinforcement, it must nevertheless be possible to ensure adequately high strength by this means.

SUMMARY OF THE INVENTION

The aim of the invention is therefore to provide a protective element of the abovementioned type that has an as advantageous as possible cohesion and strength. Said aim is achieved in that the projections are on either side of a flat base and extend transversely thereto. Preferably, the projections are in the middle of the base. Furthermore, they can have all conceivable shapes; a cylindrical shape and a conical shape are mentioned as examples.

The projections are preferably oriented perpendicularly with respect to the base. Furthermore, the base can have at least one auxiliary projection at the periphery which extends parallel to or in line with the base.

The base as well can have various shapes. A non-circular shape, such that the protective element will not easily start to roll under the influence of the water forces, is preferred. The base is preferably polygonal, preferably rectangular, pentagonal or hexagonal. For ease of production a peripheral shape based on a regular polygon is preferred. There can be an auxiliary projection at each corner of the base.

Just like the base, a projection can have various peripheral shapes. A non-circular shape is preferred because of the resistance to rolling. The periphery of a projection is preferably polygonal. One possibility is that the periphery of a projection is a regular polygon, just like the periphery of the base. If the peripheral shapes are of identical shape, in the case of a polygon with n corners the preference is that the polygon of the projection is turned through the order of 360/2n degrees of an arc with respect to the polygon of the base.

Another preferred embodiment for the shape of the projection is that the end terminates in a flat surface. In this context it is preferable that this surface is virtually perpendicular to a longitudinal axis of the projection.

The material from which the element is made is preferably concrete, which contains at least cement, sand, granulate or gravel and optionally hardeners and/or plasticisers. Another preferred embodiment of the material is a material that at least consists of a residue from oil refining, sand, rock-like granulate or gravel. Such a material is known under the trade name C-Fix®. This can be compared with a sort of cement-bound concrete, where the cement has been replaced by a residue from oil refining, the melting point of which is above 150° C.

A possible method for producing a protective element using this material is as follows. The material is heated to above the melting point of the residue material from oil refining. This material is introduced into individual shuttering or casting moulds for the base or projections, after which said material is allowed to cool. A protective element is then assembled by locally heating the joining end of a projection and the joining location on the base. The projection and base are then brought together and the join is allowed to cool, as a result of which a permanent join is produced.

Another preferred embodiment of the base of the protective element is that this has two parallel surfaces.

Another possibility for production of a protective element is to produce this in a split shuttering. For this purpose a raised area is made on the ground, after which a split box is placed on this elevation. This box split by a vertical plane has a bottom box which is open at the top and the bottom. The open bottom fits over the elevation in a sealed manner. A top box is attached to the bottom box, which top box can be moved relative to the bottom box.

Material for the element is poured via the open top of the bottom box, as a result of which the base and at least a bottom projection is formed, the bottom of this projection being on the elevation. After the material has set to some extent, material is poured into the top box for the top projection. After all the material has set, the top box is raised a short distance using lifting means, which are between the bottom box and top box, for freeing the material and the box. The bottom box is then lowered a short distance, which is less than the distance traveled by the top box, to free the box. This lowering is effected by known lifting means in the support means, such as legs which are provided with threaded adjustment means. These legs are located below each part of the bottom box. The closure means between the parts of the split box are then unlocked and the parts of the bottom box are removed together with their top box. The box can then be re-used.

BRIEF DESCRIPTION OF THE DRAWINGS

The invention will be explained in more detail below with reference to a few illustrative embodiments shown in the figures.

DESCRIPTION OF THE PREFERRED EMBODIMENTS

Figure 1:
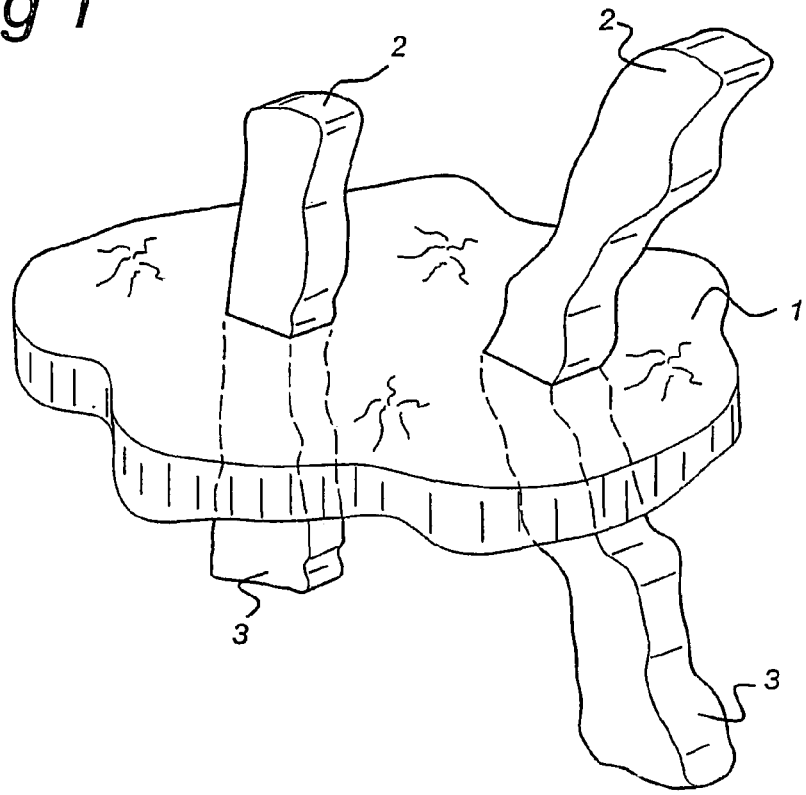
FIG. 1 shows a perspective view of the principle of a protective element according to the invention.
Figure 2:
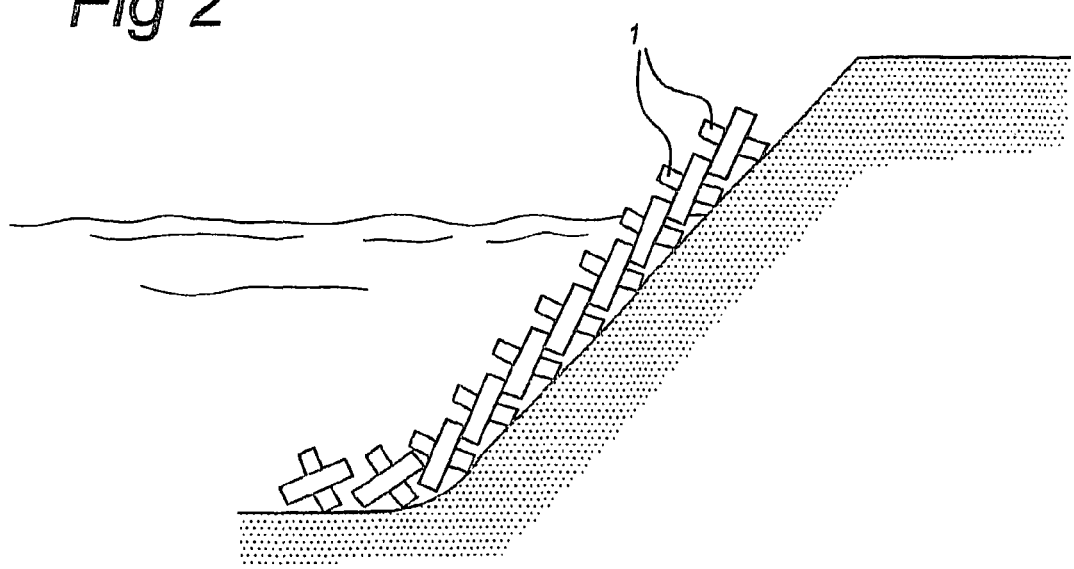
FIG. 2 shows, diagrammatically, an example of the use of the protective element.

FIG. 1 shows the basic principle of a plate-shaped base 1 and top and bottom projections 2 and 3, respectively. FIG. 2 shows protective elements which are situated on an incline of a breakwater.

Figure 3:
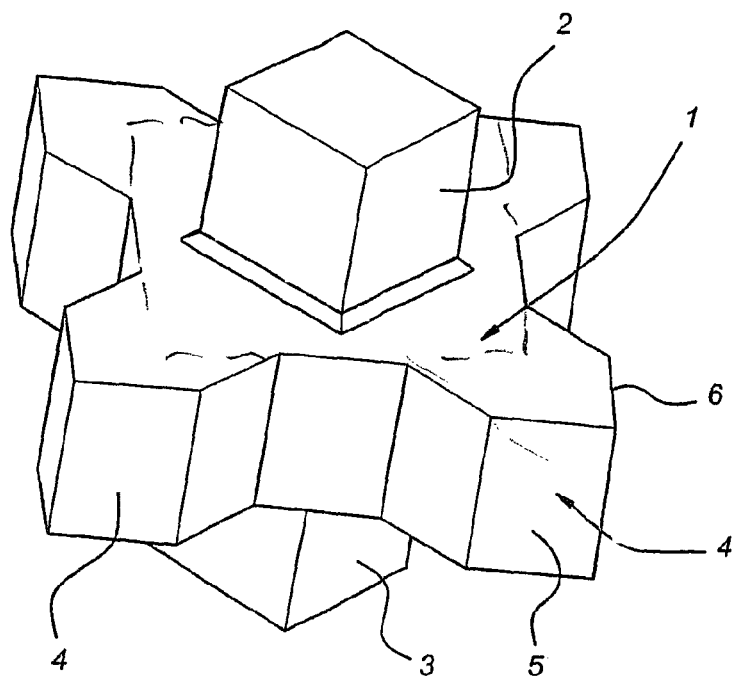
FIG. 3 shows a perspective view of a first illustrative embodiment of the protective element according to the invention.
Figure 4:
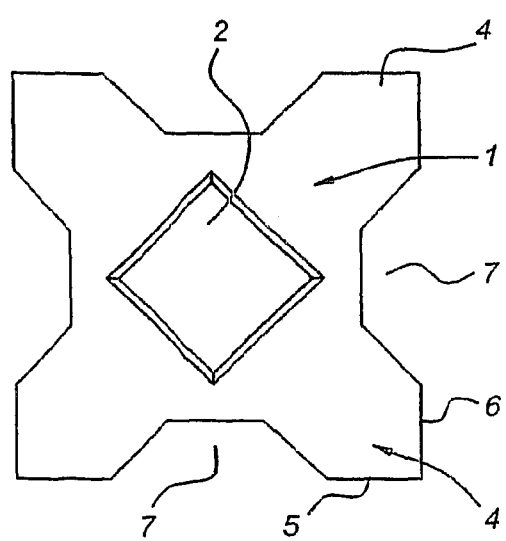
FIG. 4 shows a plan view of the element according to FIG. 1.
Figure 5:
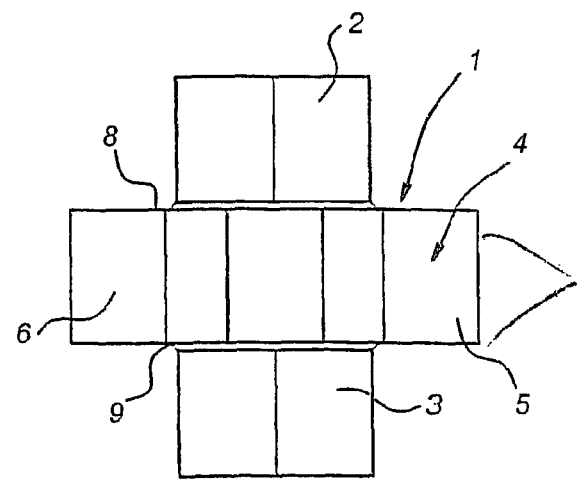
FIG. 5 shows a side view of the element according to FIG. 1.

The protective element for a breakwater shown in FIGS. 3-5 comprises a plate-shaped base 1, indicated in its entirety by 1, on either side of which projections 2 and 3 extend perpendicularly. The base 1 is essentially rectangular and at the four corners has projections 4 which have a pointed shape determined by the sloping surfaces 5, 6.

The projections 4 define recesses 7 between them, through which the water is able to flow freely. The polygonal, in this case square, shape of the base body 1 guarantees high stability.

The base 1 has two surfaces 8, 9 facing away from one another which are parallel to one another.

Figure 6:
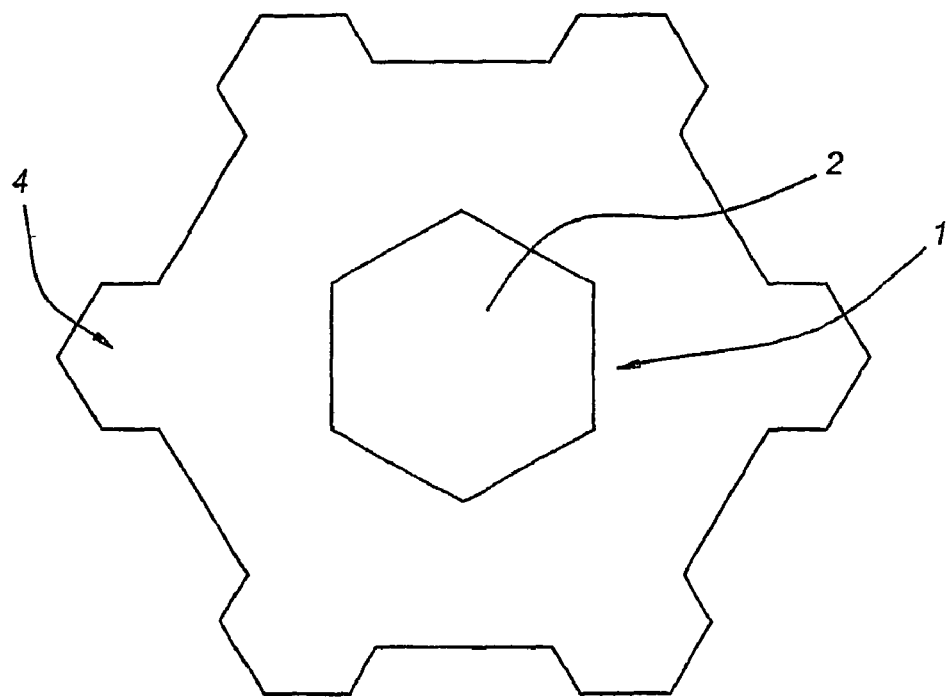
FIG. 6 shows a further embodiment of the protective element according to the invention.

In the embodiment in FIG. 6 a plan view is shown of a hexagonal protective element provided with two hexagonal projections 2 (one can be seen in FIG. 4) as well as six projections 4.

Figure 7:
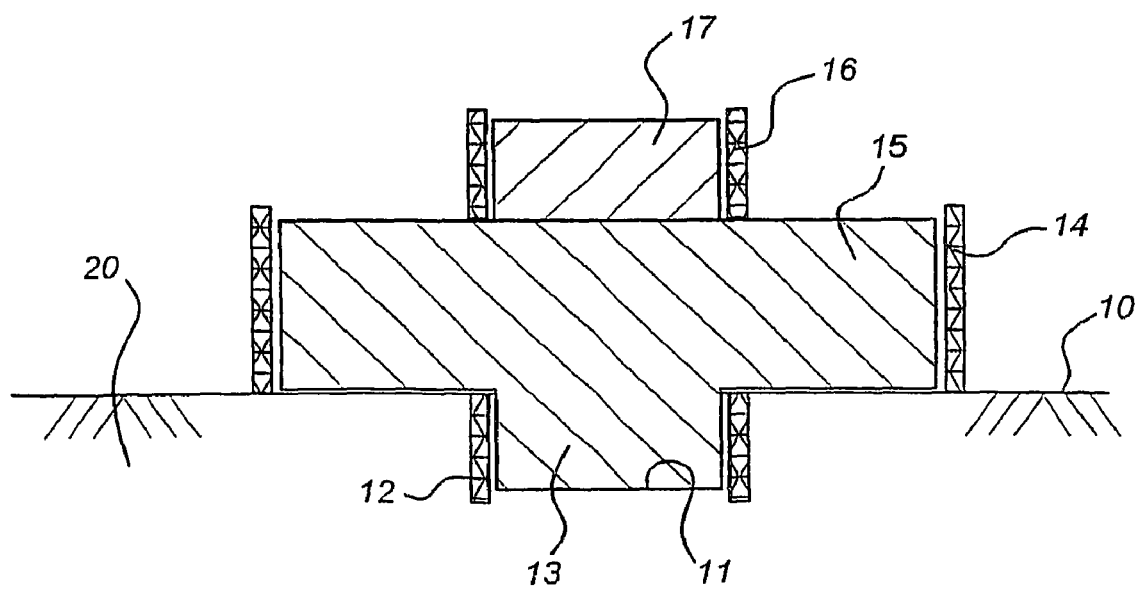
FIG. 7 shows a possible production method.

FIG. 7 shows a possible method for the production of a protective element according to the invention. For this purpose a first recess 11, defined by shuttering 12, is made in a substrate 20. A first quantity of concrete 13 is poured into this shuttering 12, up to ground level 10, to form a first projection of the protective element to be produced.

A second shuttering 14 is produced on the ground 10, into which a second quantity of concrete 15 is then poured to produce the base. It is also possible to wait until the second shuttering 14 has been produced on the ground 10 before pouring the first quantity of concrete 13. The quantity of concrete 13 and 15 can then be poured in a single operation, as a result of which the bottom projection and the base are produced at the same time.

After this base has set to some extent, third shuttering 16 is placed on top of this to receive a quantity of concrete 17 that is to form the top projection.

After the quantities of concrete 13, 15, 17 have set, the protective element is complete.

Figure 8A:
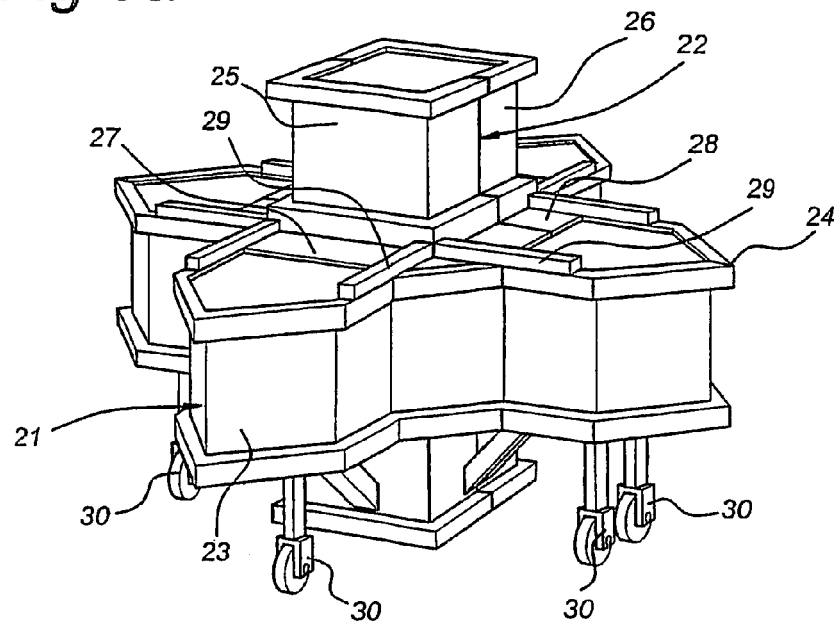
FIG. 8 shows a possible variant of split shuttering for the production of a protective element.
Figure 8B:
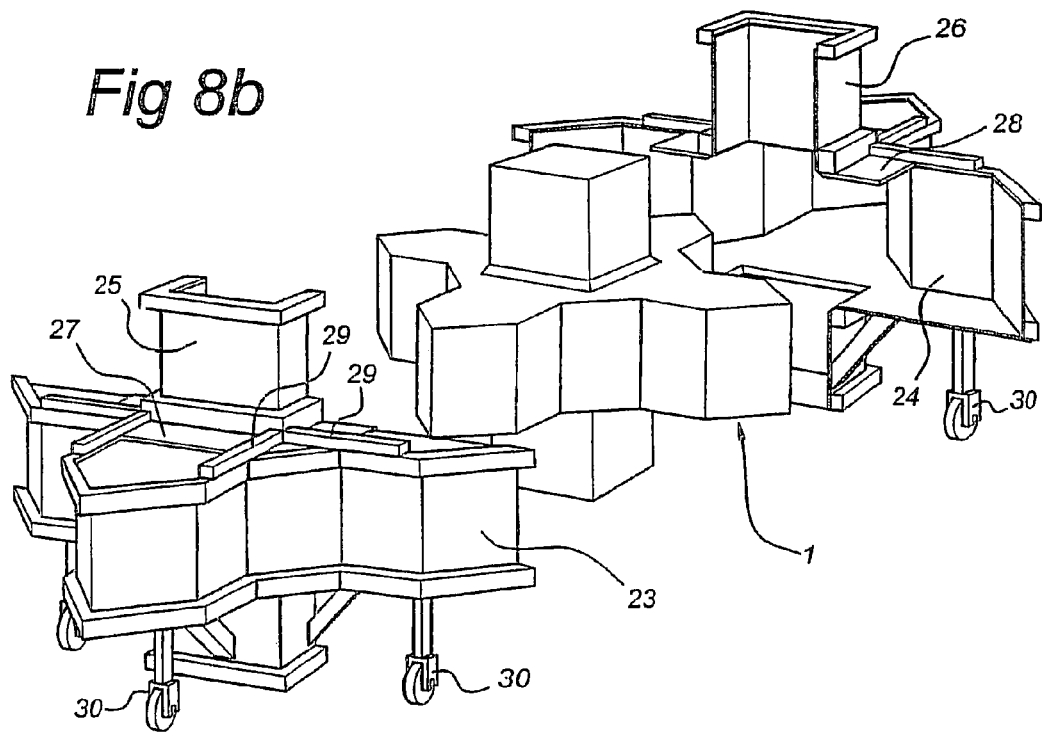

FIG. 8 shows another shuttering for the production of an element from FIG. 3-5. This shuttering consists of two halves split by a vertical plane. FIG. 8a shows a box in the closed state, in which the element will be released from the box. The bottom box 21 consists of a left-hand bottom box 23 and a right-hand bottom box 24, which are open at the top and at the bottom. The top box 22 connected to the bottom box 22 by the connecting means 29 consists of a left-hand top box 25 and a right-hand top box 26. Lifting means are incorporated in the connecting means 29 to enable the top box to be lifted with respect to the bottom box. At least three support means 30 are positioned below the bottom box, which support means can be provided with wheels. Known lifting means are incorporated in the support means 30 to enable the bottom box to be lowered. The bottom of the top box is provided with a left-hand and a right-hand apron 27 and 28, respectively, which lies on the top of the poured material for the base of the element and ensures good abutment and correct rounding-off between base and top projection. The poured element 1 with the left-hand and right-hand half of the shuttering removed can be seen in FIG. 8b.

The invention claimed is:

1. A method of making a protective element for a breakwater, the protective element having a plate-shaped base and two projections extending from opposite sides of the base, the method comprising the steps of:

creating a cavity in a substrate and inserting bottom shuttering into the substrate at sides of the cavity to define a mold for a first of the two projections;

erecting a middle shuttering on a surface of the substrate so as to define a mold for the base;

erecting a top shuttering above the middle shuttering to define a mold for a second of the two projections; and pouring concrete into the bottom, middle, and top shutterings separately or continuously and allowing the concrete to set, whereby the set concrete forms the protective element, wherein the step of pouring the concrete includes pouring concrete into the bottom and middle shutterings and allowing the concrete in the bottom and middle shutterings to set sufficiently to support the top shuttering, and wherein the step of erecting the top shuttering includes erecting the top shuttering on a surface of the concrete in the middle shuttering.

2. The method of claim 1, wherein the middle shuttering defines a substantially square central portion and four auxiliary projections that each extend from a different respective corner of the central portion and that are spaced apart from each other by substantially equally sized recesses.

3. The method of claim 2, wherein each of the four auxiliary projections extends in a direction of a diagonal of the central portion crossing the respective corner and has opposite faces that are each substantially parallel to a respective side of the central portion.

4. The method of claim 3, wherein the bottom and top shutterings each defines a square mold.

5. A method of making a protective element for a breakwater, the protective element having a plate-shaped base and two projections extending from opposite sides of the base, the method comprising the steps of:

providing two halves of a mold that defines the protective element when the two halves are joined, each of the two halves having bottom shuttering that defines half of a first of the two projections, middle shuttering that is attached to the bottom shuttering and defines half the base, and top shuttering that is movably attached to the middle shuttering and that defines half of a second of the two projections, the middle shuttering having a lower surface with an opening to the bottom shuttering, the bottom shuttering being elevated on a raised area;

joining the two halves;

pouring concrete into the mold and allowing the concrete to set;

moving the top shuttering up to free the top shuttering from the concrete;

moving the bottom and middle shuttering down to free the bottom and middle shuttering from the concrete; and removing the two halves from the concrete form the protective element.

6. The method of claim 5, wherein the middle shuttering defines a substantially square central portion and four auxiliary projections that each extend from a different respective corner of the central portion and that are spaced apart from each other by substantially equally sized recesses.

7. The method of claim 6, wherein each of the four auxiliary projections extends in a direction of a diagonal of the central portion crossing the respective corner and has opposite faces that are each substantially parallel to a respective side of the central portion.

8. The method of claim 7, wherein the joined two halves of the top shuttering define a square mold, and the joined two halves of the bottom shuttering define a square mold.

9. The method of claim 5, wherein the lower surface of the middle shuttering is supported by wheels on which the respective half of the mold rests when the two halves are removed from the concrete.

10. The method of claim 5, wherein the top shuttering moves up a first distance during the step of moving the top shuttering up and wherein the bottom and middle shuttering move down a second distance that is less than the first distance during the step of moving the bottom and middle shuttering down.

11. The method of claim 5, wherein the pouring step includes pouring concrete into the bottom and middle shutterings and allowing the concrete in the bottom and middle shutterings to set at least partially, and then pouring concrete into the top shuttering.

* * * * *